United States Patent
Seong

(10) Patent No.: US 7,231,866 B2
(45) Date of Patent: Jun. 19, 2007

(54) OPENING AND CLOSING SWITCH STRUCTURE FOR VALVE PIN CONTROL OF GAS CYLINDER

(75) Inventor: Baek-Hyung Seong, Seoul (KR)

(73) Assignee: Korea Gas Spring Co., Ltd., Incheon (KR)

( * ) Notice: Subject to any disclaimer, the term of this patent is extended or adjusted under 35 U.S.C. 154(b) by 99 days.

(21) Appl. No.: 11/098,544

(22) Filed: Apr. 5, 2005

(65) Prior Publication Data

US 2005/0224742 A1    Oct. 13, 2005

(30) Foreign Application Priority Data

Apr. 13, 2004  (KR) ................... 20-2004-0010198

(51) Int. Cl.
*A47C 1/06* (2006.01)
(52) U.S. Cl. .................. 91/437; 92/117; 297/344.19
(58) Field of Classification Search .............. 91/437; 92/117; 297/344.19
See application file for complete search history.

(56) References Cited

U.S. PATENT DOCUMENTS

| | | | | |
|---|---|---|---|---|
| 3,450,433 A | * | 6/1969 | Ballard | ............... 297/354.12 |
| 4,257,582 A | * | 3/1981 | Wirges | ............... 297/344.19 |
| 4,415,135 A | * | 11/1983 | French | ............... 248/161 |
| 4,662,681 A | * | 5/1987 | Favaretto | ............... 297/399 |
| 4,813,743 A | * | 3/1989 | Mizelle | ............... 297/301.2 |
| 6,276,756 B1 | * | 8/2001 | Cho et al. | ............... 297/344.19 |
| 7,007,587 B2 | * | 3/2006 | Zanden | ............... 91/437 |
| 7,059,592 B2 | * | 6/2006 | Huh et al. | ............... 297/344.19 |

* cited by examiner

*Primary Examiner*—Igor Kershteyn
(74) *Attorney, Agent, or Firm*—Birch, Stewart, Kolasch & Birch, LLP

(57) ABSTRACT

The cable type opening and closing switch structure for a valve pin control of a gas cylinder is disclosed. There is provided a cable type opening and closing switch structure for a valve pin control of a gas cylinder, comprising a ball that is slide-contacted with an upper end of the valve pin; an opening and closing member that is engaged at an inner portion of an upper side of the cylinder member like surrounding the ball by a certain width and is connected with a cable having an upper end connected with an operation lever for thereby being movable in left and right directions and has an engaging end at an outer side of a lower end surrounding the ball and is rotated with respect to the engaging end as the cable is moved, for thereby moving up and down the valve pin contacting with the ball; and a guide member that is fixedly engaged at an inner portion of an upper side of the cylinder member for thereby forming a guide hole capable of guiding the left and right movements of the opening and closing member and has an engaging portion for thereby maintaining a hinged state as the engaging end is engaged at one side of the same.

3 Claims, 3 Drawing Sheets

OPENING AND CLOSING SWITCH STRUCTURE FOR VALVE PIN CONTROL OF GAS CYLINDER

BACKGROUND OF THE INVENTION

1. Field of the Invention

The present invention relates to a cable type opening and closing switch structure for a valve pin control of a gas cylinder, and in particular to a cable type opening and closing switch structure for a valve pin of a gas cylinder capable of preventing an abrasion of an opening and closing switch and achieving an easier assembling operation in such a manner that a valve pin adapted to control the flow of gas in a valve of a gas cylinder is slid in cooperation with a ball disposed at an opening and closing switch and is moved up and down.

2. Description of the Background Art

Generally, a gas cylinder is adapted to a height control structure of a seating part of a chair for thereby moving up or down the seating part based on a user's selection.

The gas cylinder includes a base supported on a floor, an outer container assembly that is inserted into a center portion of the base and has a vertical rod therein, a cylinder member that is slide-inserted into an inner surface of the outer container assembly wherein an inner surface of the same is slide-engaged with the rod, and an upper side of the same is engaged with the seating part, an inner pipe that is installed in the cylinder member with a certain distance and is slide-engaged with an upper end piston of the rod, a valve that is engaged with the cylinder member wherein a lower side of the same is engaged with the inner pipe for thereby circulating gas, a valve pin that is inserted into the valve in an axial direction for thereby opening and closing a flow path, an opening and closing lever that is connected with an upper side of the valve pin for thereby moving up and down the valve pin, and an operation lever connected with the opening and closing lever through a cable.

The gas cylinder is operated using an operation lever. When pulling the operation lever, the opening and closing lever allows the valve pin to move down for thereby pushing the piston, so that the cylinder member is moved up. Therefore, the seating part is moved up. When the seating part is moved up and an external force of the operation lever is removed at a certain position during the movement, the valve pin closes the flow path, so that the seating part maintains a fixed state. In addition, after the operation lever is operated, when the seating part is pushed with a certain force higher than the gas pressure, the gas flows through the space between the flow path of the valve, the cylinder member and the inner pipe for thereby moving up the piston, so that seating part is moved down.

The opening and closing lever adapted to move up and down the valve pin of the valve in the gas cylinder is designed in such a manner that one end of the same is hinged with an upper inner side of the cylinder member, and the other end of the same presses the upper side of the valve pin, so that the contacting portions are easily damaged due to the friction with the upper end of the valve pin.

SUMMARY OF THE INVENTION

Accordingly, it is an object of the present invention to overcome the problems encountered in the conventional art.

It is another object of the present invention to provide a cable type opening and closing switch structure for a valve pin control of a gas cylinder capable of achieving a stable up and down movement of the valve pin and preventing a certain abrasion due to a long time use in such a manner that a valve pin adapted to enable a gas flow in a gas cylinder is moved up and down based on a ball contact slide method.

To achieve the above objects, in a gas cylinder that includes a cylinder member capable of moving a piston rod forwardly and backwardly in cooperation with the flow of gas, an inner pipe capable of guiding the flow of gas in the cylinder member, and a valve that is engaged with the inner pipe at an upper side of the cylinder member for thereby selectively controlling the flow of gas based on an up and down movement of the valve pin of the center portion, there is provided a cable type opening and closing switch structure for a valve pin control of a gas cylinder that comprises a ball that is slide-contacted with an upper end of the valve pin; an opening and closing member that is engaged at an inner portion of an upper side of the cylinder member like surrounding the ball by a certain width and is connected with a cable having an upper end connected with an operation lever for thereby being movable in left and right directions and has an engaging end at an outer side of a lower end surrounding the ball and is rotated with respect to the engaging end as the cable is moved, for thereby moving up and down the valve pin contacting with the ball; and a guide member that is fixedly engaged at an inner portion of an upper side of the cylinder member for thereby forming a guide hole capable of guiding the left and right movements of the opening and closing member and has an engaging portion for thereby maintaining a hinged state as the engaging end is engaged at one side of the same.

The guide member includes a stopper having a guide groove so that a pulling force is controlled at a certain position as the cable of the opening and closing member is pulled, and the cable is guided.

A certain rounded surface is formed at a lower side of the opening and closing member and an inner wall of the guide hole of the guide member corresponding to the lower side of the same, so that the opening and closing member is stable-rotated with a certain gap.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings. In the descriptions concerning the gas cylinder that adapts an opening and closing member according to the present invention, the descriptions of the elements deemed to make the subject matters of the present invention unclear or the elements already described in the prior art would be omitted.

Figure 1:
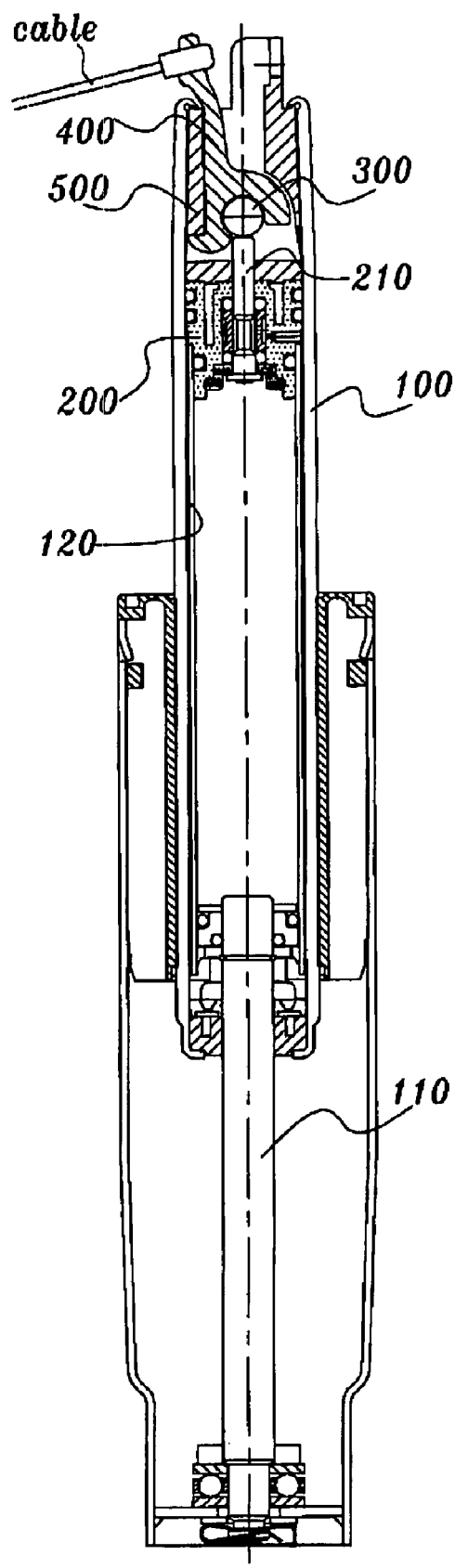
FIG. 1 is a cross sectional view illustrating a cable type opening and closing switch structure for a valve pin control of a gas cylinder according to the present invention.

As shown in FIG. 1, the cable type opening and closing switch structure for a valve pin control of a gas cylinder according to the present invention includes a cylinder member 100 adapted to move a piston rod 110 upwardly and downwardly in cooperation with the flow of gas which flows though a space formed between an inner wall of the cylinder member 100 and an outer surface of the valve 200, an inner pipe 120 adapted to guide the flow of gas in the cylinder member 100, a valve 200 engaged with the inner pipe 120 at an upper side of the cylinder member 100 for thereby selectively controlling the flow of gas based on an up and down movement of a valve pin 210, a ball 300 that is slide-contacted with an upper end of the valve pin 210, an opening and closing member 400 that is rotated in a state that the ball 300 is supported for thereby rotating the ball 300, a guide member 500 that guides and rotates the opening and closing member 400, a cable that pulls the opening and closing member 400, and an operation lever that operates the cable.

The cylinder member 100 has the same structure and function as the conventional art. The cylinder member 100 includes a piston rod 110 that is moved up and down based on the flow of gas therein and is slide-engaged with an outer container of which an outer surface is mounted on the ground. The cylinder member 200 supports the piston rod 110 mounted on the ground for thereby moving up and down.

An inner pipe 120 is provided between the cylinder member 100 and the piston rod 110. The gas is flown through a gap between the inner pipe 120 and the cylinder member 100 for thereby moving the piston rod 110 forwardly and backwardly.

Here, the valve 200 has the same function and structure and is engaged at an inner side of the cylinder member 100 together with the inner pipe 120 for thereby controlling the flow of gas based on the up and down movements of the valve pin 210 at the center portion of the same.

The opening and closing member 400 is provided at an upper inner side of the cylinder member 100. A ball engaging groove 420 is opened in a downward direction so that the ball 300 slide-contacting with the upper end of the valve pin is slide-engaged. An engaging end 410 is formed at an outer end of the same.

In addition, a cable connection hole is formed at an upper end of the opening and closing member 400. One end of the cable is engaged with the cable connection hole, and a circular rounded surface is formed at the other outer end of the lower side.

Namely, the ball 300 presses the upper end of the valve pin 210 with respect to a hinged point of the engaging end 410 during the left and right movements when the cable is pulled.

The guide member 500 is fixed at an upper inner portion of the cylinder member 100 for thereby guiding the left and right movements of the opening and closing member 400. A guide hole 510 is formed at the center in an axial direction for guiding the left and right movements of the opening and closing member 400. An engaging portion 520 is formed at one side of the same for maintaining a hinged state as the engaging end 410 is engaged. In addition, a rounded surface 550 corresponding to the rounded surface 430 of the opening and closing member 400 is formed at a lower side of the inner surface. A stopper 540 having a guide groove 530 is protruded from the upper end so that a pulling force is controlled at a certain position when pulling the cable of the opening and closing member 400, and the cable is guided.

The operation of the cable type opening and closing switch structure for a valve pin control of a gas cylinder according to the present invention will be described with reference to the accompanying drawings.

Figure 2:
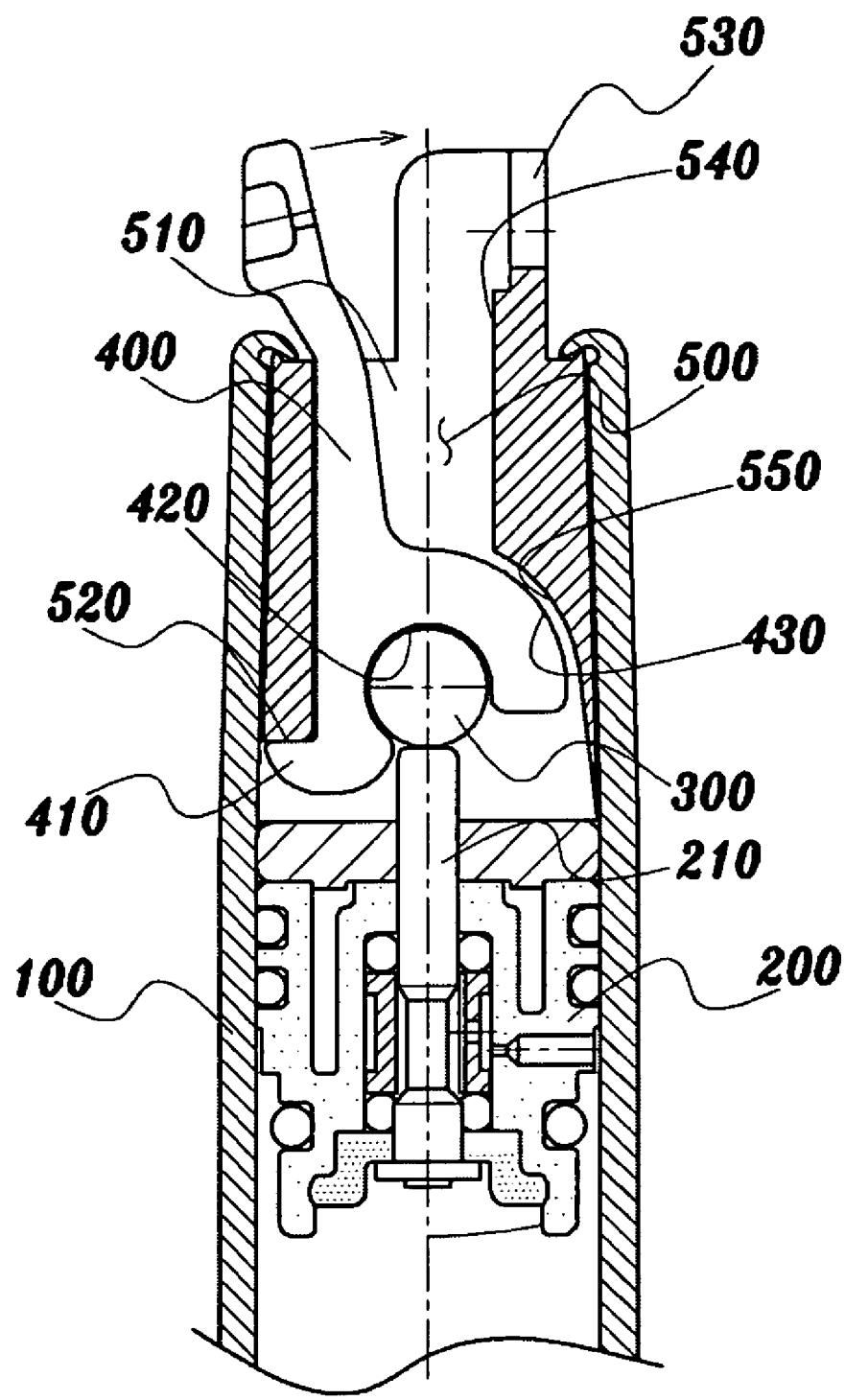
FIG. 2 is an enlarged cross sectional view of FIG. 1 illustrating an operation state before an operation assembly is operated according to the present invention.
Figure 3:
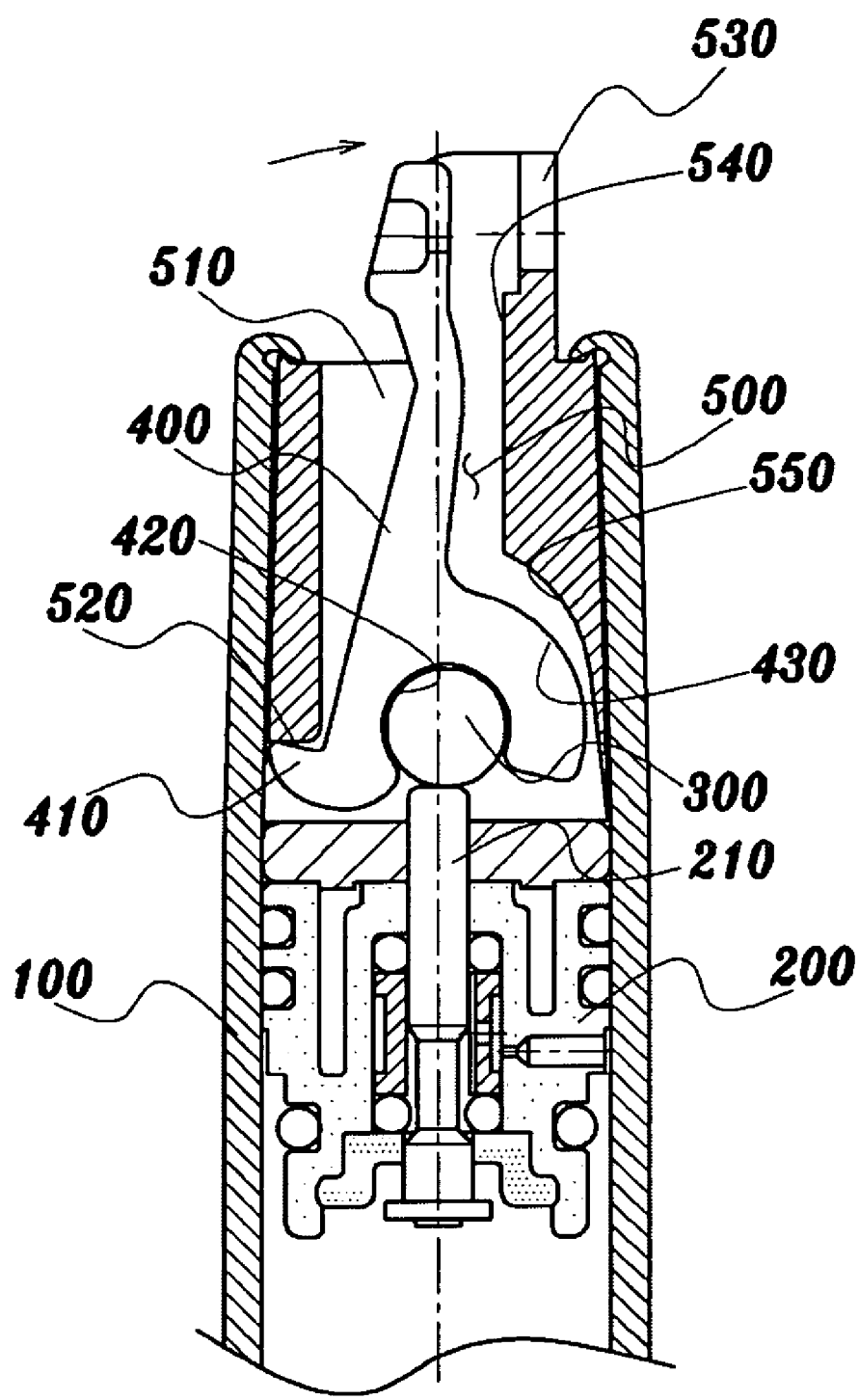
FIG. 3 is an enlarged cross sectional view of FIG. 1 illustrating an operation state after an operation assembly is operated according to the present invention.

In an assembled state shown in FIG. 1, the operation lever is operated as shown in FIG. 2, and the cable is pulled. Therefore, the opening and closing member 400 shown in FIG. 3 is pulled. At this time, a certain rotational force is generated based on the support of the ball 300 in a state that the engaging end 410 of the lower side of the opening and closing member 400 is engaged with the engaging portion 520 of the lower side of the guide member 500. The opening and closing member 400 transfers the external force to the ball 300 by a continuously transferred external force. At this time, the ball 300 is rotated with respect to the hinged point of the engaging end 410 and presses the upper side of the valve pin 210, so that the flow of gas is controlled based on the down movement of the valve pin 210.

When the operation of the operation lever is released, the opening and closing member 400 is rotated to its original state by a moving-up force of the valve pin 210, so that a stable fixing force is obtained in such a manner that escape is prevented as the engaging end 410 and the rounded surface 530 are engaged.

As described above, in the cable type opening and closing switch structure for a valve pin control of a gas cylinder according to the present invention, the opening and closing member capable of operating the valve pin can be easily installed at the cylinder member, so that the cost is significantly decreased. The spherical ball engaged with the opening and closing member for thereby moving up and down the valve pin is slide-contacted with the valve pin, so that it is possible to significantly prevent the abrasion.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A cable type opening and closing switch structure for a valve pin control of a gas cylinder, which includes a cylinder member adapted to move a piston rod upwardly and downwardly in cooperation with flow of gas, an inner pipe adapted to guide the flow of gas in the cylinder member, and a valve that is engaged with the inner pipe at an upper side of the cylinder member for thereby selectively controlling the flow of gas based on an up and down movement of the valve pin of the center portion, comprising:

a ball which is slide-contacted with an upper end of the valve pin along the entire outer surfaces of the ball;

an opening and closing member which is engaged at an inner portion of an upper side of the cylinder member in such a manner that an inner grooved surface of the opening and closing member surrounds the ball over a certain area and is connected with a cable having an upper end connected with an operation lever for thereby being movable in left and right directions and has an engaging end at an outer side of a lower end surrounding the ball and is rotated with respect to the engaging end as the cable is moved, for thereby moving up and down the valve pin contacting with the ball; and a guide member which is fixedly engaged at an inner portion of an upper side of the cylinder member for thereby forming a guide hole, which allows the left and right movements of the opening and closing member to be guided and has an engaging portion for thereby maintaining a hinged state as the engaging end is engaged at one side of the same.

2. The structure of claim 1, wherein said guide member includes a stopper having a guide groove so that a puffing force is controlled at a certain position as the cable of the opening and closing member is pulled, and the cable is guided.

3. The structure of either claim 1 or claim 2, wherein a certain rounded surface is formed at a lower side of the opening and closing member and an inner wall of the guide hole of the guide member corresponding to the lower side of the same, so that the opening and closing member is stable-rotated with a certain gap.

* * * * *